US012188619B2

(12) United States Patent
Ku et al.

(10) Patent No.: US 12,188,619 B2
(45) Date of Patent: Jan. 7, 2025

(54) SAFETY VACUUM SUPPLY GAS CYLINDER

(71) Applicants: Feng Yuan Ku, Hsinchu County (TW); Min-Kuang Chang, Miaoli County (TW)

(72) Inventors: Feng Yuan Ku, Hsinchu County (TW); Min-Kuang Chang, Miaoli County (TW)

( * ) Notice: Subject to any disclaimer, the term of this patent is extended or adjusted under 35 U.S.C. 154(b) by 0 days.

(21) Appl. No.: 17/512,690

(22) Filed: Oct. 28, 2021

(65) Prior Publication Data

US 2022/0178501 A1 Jun. 9, 2022

(30) Foreign Application Priority Data

Dec. 8, 2020 (TW) ................................ 109143127

(51) Int. Cl.
*F17C 13/04* (2006.01)

(52) U.S. Cl.
CPC ...... *F17C 13/04* (2013.01); *F17C 2201/0109* (2013.01); *F17C 2205/0335* (2013.01); *F17C 2205/0347* (2013.01); *F17C 2205/0367* (2013.01); *F17C 2205/0391* (2013.01); *F17C 2221/037* (2013.01); *F17C 2223/038* (2013.01); *F17C 2260/044* (2013.01)

(58) Field of Classification Search
CPC ......................... F17C 13/04; F17C 2205/0391
See application file for complete search history.

(56) References Cited

U.S. PATENT DOCUMENTS 6,911,065 B2 * 6/2005 Watanabe ................. F17C 5/00 96/138
2004/0159005 A1 * 8/2004 Olander .................. C23C 16/52 34/92
2019/0277452 A1 * 9/2019 Despres ................... B01J 20/20

FOREIGN PATENT DOCUMENTS

CN 112325146 A * 2/2021
WO WO-2021262480 A1 * 12/2021

OTHER PUBLICATIONS

Entergris "Novel, Safe Approach to Process Gas Delivery" (Year: 2018).*

* cited by examiner

*Primary Examiner* — Kenneth Rinehart
*Assistant Examiner* — Nicole Gardner

(57) ABSTRACT

A safety vacuum supply gas cylinder includes a cylinder body, a pipeline structure, first and second check valves (respectively having first and second check valve opening pressures $P_{c1}$, $P_{c2}$, wherein $P_{c1}$ is greater than an atmospheric pressure $P_0$). The cylinder body has an opening and an internal space configured to store a gas, wherein the gas forms an internal pressure $P_2$ smaller than $P_0$. The pipeline structure, communicated with the opening, has first and second pipelines where the first and second check valves are respectively arranged. An external filling gas enters the cylinder body when a pressure of the external filling gas is greater than $P_{c1}$ and $P_2$. The gas flows out when $P_2$ is greater than $P_{c2}$ and an external environmental pressure.

8 Claims, 3 Drawing Sheets

SAFETY VACUUM SUPPLY GAS CYLINDER

FIELD OF THE INVENTION

The present invention relates to negative pressure gas storage, and more particularly to a safety vacuum supply gas cylinder and a safe operation of the safety vacuum supply gas cylinder.

BACKGROUND OF THE INVENTION

Many industrial processes, including semiconductors, use toxic or harmful gases, such as $AsH_3$, $PH_3$, and $BF_3$. The gas is generally stored in a gas cylinder for use in, for example, an ion implantation process. In order to avoid the leakage of the toxic and harmful gases at a high pressure when the gas cylinder is being opened, the toxic and harmful gases are usually stored in the gas cylinder with a negative pressure and an adsorbent. However, because the external atmospheric pressure is greater than the negative pressure in the gas cylinder, the external air may easily flow into the gas cylinder when the valve of the gas cylinder is opened, which will pollute the gas stored in the gas cylinder and possibly cause the generation of other toxic and harmful gases due to the reaction of the stored gas and the external air. The toxic and harmful gases begin to diffuse outward once the negative pressure of the gas cylinder rises and is equal to the external pressure, which will pollute the environment and cause risks of other kinds of toxic and harmful gases.

SUMMARY OF THE INVENTION

The invention provides a safety vacuum supply gas cylinder for storing a gas with a negative pressure and supplying the gas with a safe negative pressure operation. In addition, the safety vacuum supply gas cylinder of the invention includes a mechanism related to pressure setting and controlling to avoid the risk of leakage and pollution of the toxic and harmful gases stored in the safety vacuum supply gas cylinder.

The safety vacuum supply gas cylinder provided by the invention includes a cylinder body, a pipeline structure, a first check valve, a second check valve, and an adsorbent. The cylinder body has an opening and an internal space. The internal space of the cylinder body is configured to store the gas, and the gas forms the negative pressure in the internal space of the cylinder body. The negative pressure is smaller than an atmospheric pressure. The pipeline structure is arranged inside the cylinder body. The pipeline structure is communicated with the opening and has a first pipeline and a second pipeline. The first check valve is arranged in the first pipeline and has a first check valve opening pressure. The first check valve opening pressure is greater than the atmospheric pressure. An external filling gas enters the cylinder body via the first pipeline and the first check valve when a pressure of the external filling gas is greater than the first check valve opening pressure and the negative pressure. The second check valve is arranged in the second pipeline and has a second check valve opening pressure. The gas stored in the cylinder body flows out of the cylinder body via the second pipeline and the second check valve when the negative pressure is greater than or equal to the second check valve opening pressure and an external environmental pressure. The adsorbent is arranged in the cylinder body to absorb the gas stored in the cylinder body.

In an embodiment of the invention, the aforementioned safety vacuum supply gas cylinder further includes a cylinder valve arranged to close the opening of the cylinder body. The cylinder valve has a mouth and a passage, and the passage is communicated with the mouth and the internal space of the cylinder body.

In an embodiment of the invention, the opening is configured to be communicated with a gas filling device, and the external filling gas enters the internal space of the cylinder body from the gas filling device.

In an embodiment of the invention, the opening is configured to be communicated with a vacuum device, the vacuum device is configured to provide the external environmental pressure, and the external environmental pressure is smaller than the negative pressure.

In an embodiment of the invention, the adsorbent is an activated carbon adsorbent.

In an embodiment of the invention, the aforementioned safety vacuum supply gas cylinder further includes a first filter and a second filter. The first filter is arranged in the first pipeline, and the second filter is arranged in the second pipeline.

In an embodiment of the invention, the pipeline structure further includes the main pipeline communicated with the passage, and the first pipeline and the second pipeline are respectively connected to the main pipeline.

In an embodiment of the invention, the first check valve is a one-way valve and only allows the gas to flow into the internal space of the cylinder body, and the second check valve is a one-way valve and only allows the gas to flow out of the internal space of the cylinder body.

By using the pipeline structure, the first check valve and the second check valve, the safety vacuum supply gas cylinder of the invention can prevent the gas stored in the cylinder body from being polluted by the external air in the atmosphere and also prevent the leakage of the stored toxic and harmful gases to pollute the environment with the related opening pressure setting of the check valves.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
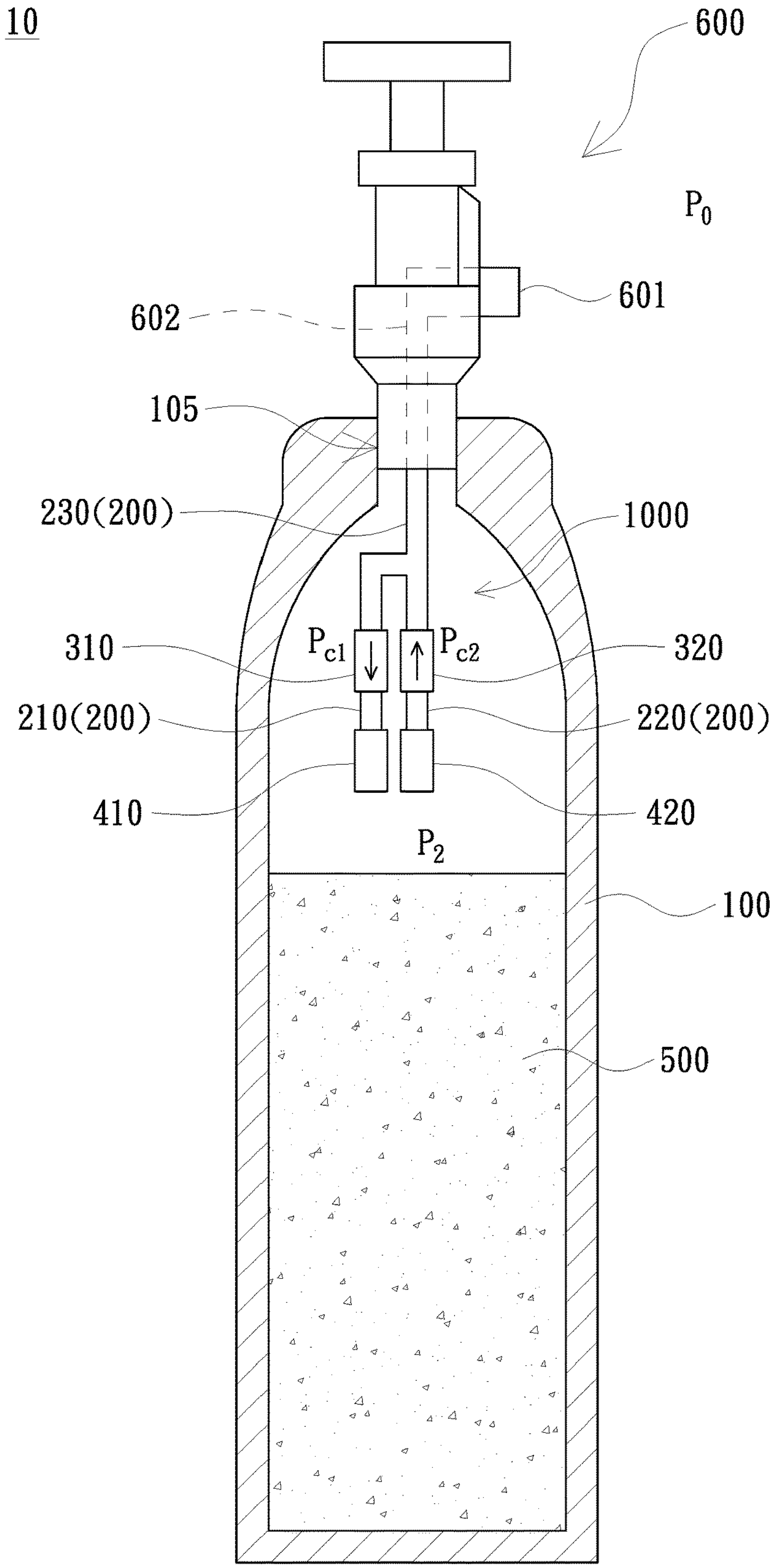
FIG. 1 is a perspective schematic diagram of a safety vacuum supply gas cylinder according to an embodiment of the invention.

FIG. 1 is a perspective schematic diagram of a safety vacuum supply gas cylinder according to an embodiment of the invention. The safety vacuum supply gas cylinder of the invention can store gas with a negative pressure and supply the negative-pressure-stored gas stored therein (or called the stored gas). Please refer to FIG. 1. The safety vacuum supply gas cylinder 10 includes a cylinder body 100, a pipeline structure 200, a first check valve 310 and a second check valve 320. The safety vacuum supply gas cylinder 10 may further include an adsorbent 500, but the invention is not limited thereto.

The cylinder body 100 has an internal space 1000 for storing the gas with a negative pressure, and the gas forms an internal pressure $P_2$ (may also called a negative pressure) in the cylinder body 100, wherein the internal pressure $P_2$ is smaller than an atmospheric pressure $P_0$. The embodiment shown in FIG. 1 is in a state that the safety vacuum supply gas cylinder 10 is filled with gas. The cylinder body 100 is also provided with an opening 105, which is configured to allow the gas to enter and to exit the cylinder body 100. The embodiment of the invention preferably further includes a cylinder valve 600, which is arranged to closes the opening 105 of the cylinder body 100. The cylinder valve 600 may be a conventional cylinder valve and may further have related gas pressure control components and/or foolproof design. The cylinder valve 600 in an embodiment of the invention has a mouth 601 and a passage 602. The passage 602 is communicated with the mouth 601 and the cylinder body 100, and the gas can enter and exit the cylinder body 100 via the passage 602 and the mouth 601.

The pipeline structure 200 is arranged inside the cylinder body 100 and is communicated with the opening 105. The pipeline structure 200 includes a first pipeline 210 and a second pipeline 220. The first check valve 310 is arranged in the first pipeline 210 and has a first check valve opening pressure $P_{c1}$. The first check valve opening pressure $P_{c1}$ is greater than or equal to the atmospheric pressure $P_0$. An external filling gas (will be described in detail later) can enter the cylinder body 100 via the first pipeline 210 and the first check valve 310 when a pressure of the external filling gas is greater than the first check valve opening pressure $P_{c1}$ and the internal pressure $P_2$. The second check valve 320 is arranged in the second pipeline 220 and has a second check valve opening pressure $P_{c2}$. The gas stored in the cylinder body 100 can flow out of the cylinder body 100 via the second pipeline 220 and the second check valve 320 when the internal pressure $P_2$ is greater than the second check valve opening pressure $P_{c2}$ and an external environment pressure (for example, when the external environment of the cylinder body 100 starts to become a vacuum; and will be described in detail later). Furthermore, the pipeline structure 200 may further include a main pipeline 230 connected to the passage 602, and the first pipeline 210 and the second pipeline 220 are respectively connected to the main pipeline 230.

An embodiment of the invention may further include a first filter 410 and a second filter 420 respectively arranged in the first pipeline 210 and the second pipeline 220. The first filter 410 and the second filter 420 are configured to filter dust and particles to prevent the respective pipelines and check valves from being stuck by the dust and particles. The adsorbent 500 is arranged in the cylinder body 100 to adsorb at least part of the stored gas to increase the gas storage capacity of the cylinder body 100. The adsorbent 500 may be in the form of, for example, block, granular, etc., like activated carbon particles or activated carbon cake. The invention does not limit the material and the form of the adsorbent 500.

A gas filling device (not shown) can be communicated with the opening 105 of the cylinder body 100 and the mouth 601 of the cylinder valve 600. The above-mentioned external filling gas can enter the internal space 1000 of the cylinder body 100 from the gas filling device. On the other hand, the opening 105 and the mouth 601 can also be communicated with a vacuum device (not shown). The vacuum device is configured to provide the above-mentioned external environmental pressure, which is smaller than the internal pressure $P_2$ in the cylinder body 100.

Figure 2:
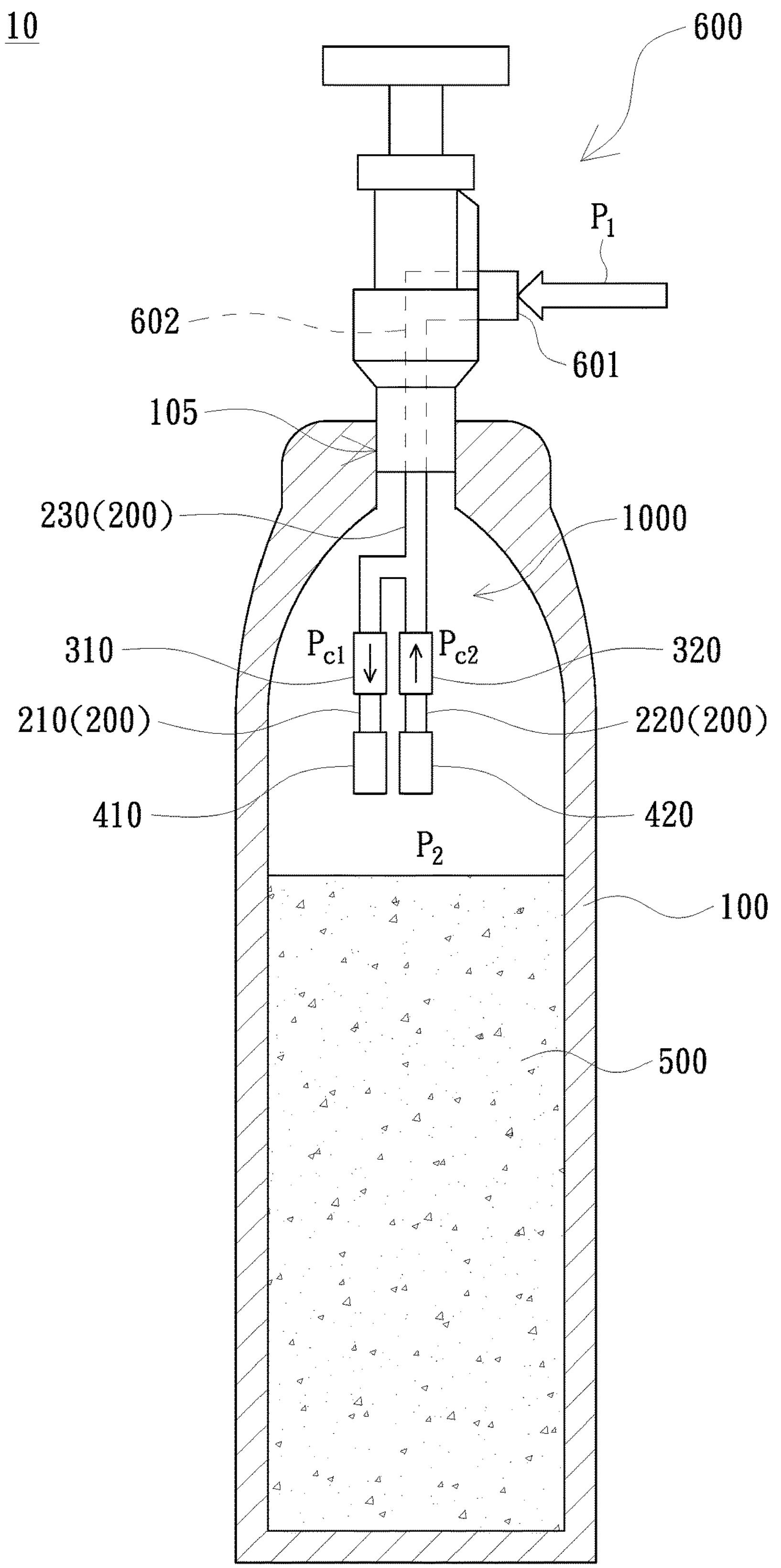
FIG. 2 is a perspective schematic diagram of a safety vacuum supply gas cylinder according to another embodiment of the invention.

FIG. 2 is a perspective schematic diagram of a safety vacuum supply gas cylinder according to another embodiment of the invention, wherein the safety vacuum supply gas cylinder 10 of the embodiment is in a state of being filled with the gas. The safety vacuum supply gas cylinder 10 has been vacuumed (will be described in detail later) before being filled with the gas, that is, the internal space 1000 of the cylinder body 100 may be in a state close to a perfect vacuum before being filled with the gas. Next, as shown in FIG. 2, the pressure $P_1$ of the external filling gas (the big arrow indicates its flow direction) is set to be greater than the first check valve opening pressure $P_{c1}$ and the internal pressure $P_2$, and the cylinder body 100 is filled with the external filling gas via the mouth 601 of the cylinder valve 600. Specifically, the mouth 601 of the cylinder valve 600 is communicated with a gas filling device (not shown) to fill the cylinder body 100 with the external filling gas. The internal pressure $P_2$ gradually increases when the filling is in progress, and the filling is completed when the internal pressure $P_2$ reaches to a default value. The internal pressure $P_2$ is smaller than the atmospheric pressure $P_0$ when the filling is completed. For example, the internal pressure $P_2$ is between 600 and 700 Torr when the filling is completed.

In the embodiment of the invention, the first check valve 310 of is a one-way valve, which only allows the gas to flow into the internal space 1000 of the cylinder body 100 (as indicated by the small arrow); and the second check valve 320 is also a one-way valve, which only allows the gas to flow out of the cylinder body 100 (as indicated by the small arrow). Therefore, the gas cannot flow out of the cylinder body 100 via the first pipeline 210. In addition, the internal pressure $P_2$ is smaller than the atmospheric pressure $P_0$, so that the stored gas cannot flow out of the cylinder body 100 via the second pipeline 220 in an environment where the pressure is 1 atm. Thus, the gas can be stored in the internal space 1000 with a negative pressure.

Figure 3:
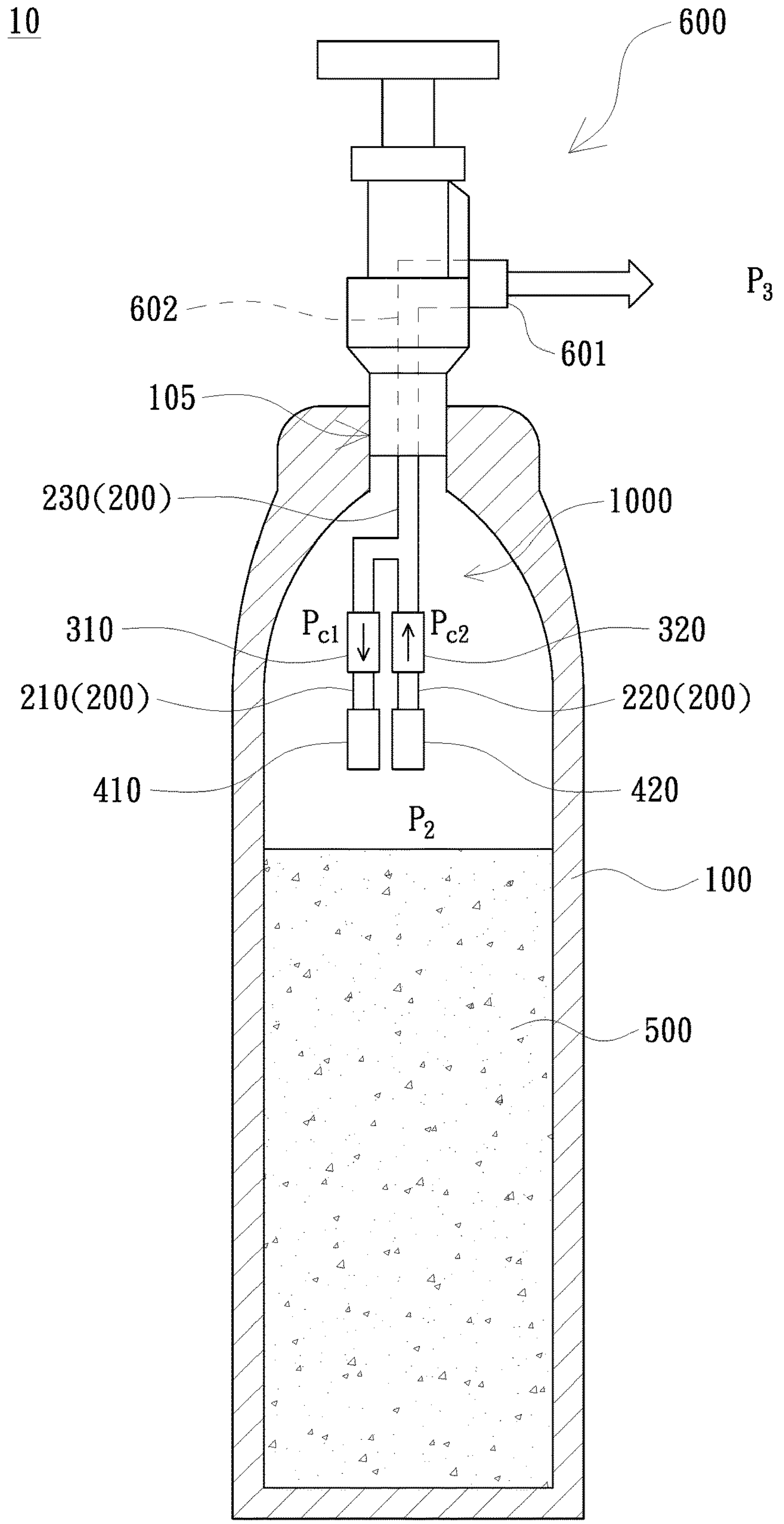
FIG. 3 is a perspective schematic diagram of a safety vacuum supply gas cylinder according to still another embodiment of the invention.

FIG. 3 is a perspective schematic diagram of a safety vacuum supply gas cylinder according to still another embodiment of the invention, wherein the safety vacuum supply gas cylinder 10 of the embodiment is in a state of being extracted/in-use. As shown in FIG. 3, the external environmental pressure $P_3$ is set to be smaller than the internal pressure $P_2$ when the safety vacuum supply gas cylinder 10 is in use or extracted. The stored gas flows out of the cylinder body 100 via the second pipeline 220 and the second check valve 320 when the internal pressure $P_2$ is greater than or equal to the second check valve opening pressure $P_{c2}$ and the external environmental pressure $P_3$. Specifically, the mouth 601 of the cylinder valve 600 is communicated with a vacuum device or process equipment (not shown) to extract the gas stored in the cylinder body 100 (the big arrow indicates the direction of the extracting flow). The internal pressure $P_2$ decreases gradually when the extracting is in progress. The safety vacuum supply gas cylinder 10 can continuously supply the stored gas to the process equipment until the internal pressure $P_2$ decreases close to a perfect vacuum. The safety vacuum supply gas cylinder 10 can be refilled with the external filling gas as the process shown in FIG. 2 after the gas stored in the cylinder body 100 runs out.

In the embodiment of the invention, the first check valve 310 and the second check valve 320 are one-way valves, and the first check valve opening pressure $P_{c1}$ is greater than or equal to the atmospheric pressure $P_0$. Thus, the ambient gas in the atmospheric environment is prevented from entering the cylinder body 100 even the cylinder valve 600 is opened in the atmospheric environment. Therefore, the reaction between the gas stored in the safety vacuum supply gas cylinder 10 and the ambient gas in the atmospheric environment can be avoided. Furthermore, the generation of the toxic or harmful gas and the leakage thereof can be avoided, thereby preventing the environmental pollution of the toxic and harmful gases and the related hazards.

Comparison between the invention and the conventional negative pressure cylinder:

1. Before Gas Filling:

The internal pressure $P_2$ of the invention is a negative pressurized vacuum or close to a negative pressurized perfect vacuum, and $P_{c1}>P_0$, $P_{c1}+P_2>P_0$. The atmospheric pressure $P_0$ is smaller than the first check valve opening pressure $P_{c1}$. Thus, the external ambient gas will not flow into the safety vacuum supply gas cylinder 10 when the cylinder valve 600 is opened in the atmospheric environment.

In contrast, the negative pressure (denoted by "$P_{2'}$") of the conventional negative pressure cylinder is a negative pressurized vacuum or close to a negative pressurized perfect vacuum, and $P_0>P_{2'}$. The conventional negative pressure cylinder is not provided with the first check valve 310 and the atmospheric pressure $P_0$ is much greater than the internal pressure $P_{2'}$. Thus, the external ambient gas can easily flow into the cylinder when the cylinder valve is opened in the atmospheric environment, which causes the risk of contamination of the gas stored in the conventional negative pressure cylinder.

2. After Gas Filling:

The internal pressure $P_2$ of the invention is between 600 and 700 Torr, and $P_{c1}>P_0$, $P_{c1}+P_2>P_0$. The sum of the first check valve opening pressure $P_{c1}$ and the internal pressure $P_2$ in the cylinder body 100 is much greater than the atmospheric pressure $P_0$. Thus, the external ambient gas cannot flow into the safety vacuum supply gas cylinder 10 even when the cylinder valve 600 is opened in an atmospheric environment, thereby ensuring that the gas stored in the cylinder body 100 will not be polluted.

In contrast, the internal pressure $P_{2'}$, of the conventional negative pressure cylinder is also between 600 and 700 Torr, and $P_0>P_{2'}$. However, the conventional negative pressure cylinder is not provided with the first check valve 310, and the atmospheric pressure $P_0$ is greater than the internal pressure $P_{2'}$. Thus, the external ambient gas can easily flow into the conventional negative pressure cylinder when the cylinder valve is opened in the atmospheric environment. In addition, the temperature in the conventional negative pressure cylinder rises after the ambient gas and the stored gas are mixed and reacted, causing the internal pressure $P_{2'}$, to rise. Eventually, the toxic and harmful gas overflows and diffuses once the internal pressure $P_{2'}$, is greater than the atmospheric pressure $P_0$, thereby causing environmental pollution and hazard.

3. After Gas Extracting and In-Use:

The internal pressure $P_2$ of the invention is a negative pressurized vacuum or close to a negative pressurized perfect vacuum, and $P_{c1}>P_0$, $P_{c1}+P_2>P_0$. The atmospheric pressure $P_0$ is smaller than the first check valve opening pressure $P_{c1}$. Thus, the external ambient gas cannot flow into the safety vacuum supply gas cylinder 10 when the cylinder valve 600 is opened in the atmospheric environment.

In contrast, the internal negative pressure $P_{2'}$, of the conventional negative pressure cylinder is a vacuum or close to a perfect vacuum after the conventional negative pressure cylinder is extracted and used, and $P_0>P_{2'}$. However, the conventional negative pressure cylinder is not provided with the first check valve 310, and the atmospheric pressure $P_0$ is much greater than the internal pressure $P_{2'}$. Thus, the external ambient gas can easily flow into the conventional negative pressure cylinder when the cylinder valve is opened in the atmospheric environment, thereby causing the risk of related pollution and the leakage of toxic and harmful gases.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A safety vacuum supply gas cylinder, for storing a gas with an internal pressure and supplying the gas with a safety negative pressure operation, the safety vacuum supply gas cylinder comprising:

a cylinder body, having an opening, wherein an internal space of the cylinder body is configured to store the gas, the gas forms the internal pressure in the internal space of the cylinder body, and the internal pressure is smaller than an atmospheric pressure and is less than 760 Torr;

a pipeline structure, arranged inside the cylinder body, wherein the pipeline structure is communicated with the opening and comprises a first pipeline and a second pipeline; wherein the second pipeline has an end away from the opening and directly leading to the internal space, and there is a pressure in the second pipeline between the end and the second check valve the same as the internal pressure;

a first check valve, arranged in the first pipeline and having a first check valve opening pressure, wherein the first check valve opening pressure is greater than the atmospheric pressure, and an external filling gas enters the cylinder body via the first pipeline and the first check valve when a pressure of the external filling gas is greater than the first check valve opening pressure and the internal pressure;

a second check valve, arranged in the second pipeline and having a second check valve opening pressure of less than 760 Torr, wherein a sum of the internal pressure and the second check valve opening pressure is less than the atmospheric pressure, and the gas stored in the cylinder body flows out of the cylinder body via the second pipeline and the second check valve when the internal pressure is greater than or equal to the second check valve opening pressure and an external environmental pressure of the cylinder body; and an adsorbent, arranged in the cylinder body to absorb the gas stored in the cylinder body.

2. The safety vacuum supply gas cylinder according to claim 1, further comprising a cylinder valve, arranged to close the opening of the cylinder body, wherein the cylinder valve has a mouth and a passage, and the passage is communicated with the mouth and the internal space of the cylinder body.

3. The safety vacuum supply gas cylinder according to claim 1, wherein the opening is configured to be communicated with a gas filling device, and the external filling gas enters the internal space of the cylinder body from the gas filling device.

4. The safety vacuum supply gas cylinder according to claim 1, wherein the opening is configured to be communicated with a vacuum device, the vacuum device is configured to provide the external environmental pressure, and the external environmental pressure is smaller than the internal pressure.

5. The safety vacuum supply gas cylinder according to claim 1, wherein the adsorbent is an activated carbon adsorbent.

6. The safety vacuum supply gas cylinder according to claim 1, further comprising a first filter and a second filter, wherein the first filter is arranged in the first pipeline, and the second filter is arranged in the second pipeline.

7. The safety vacuum supply gas cylinder according to claim 2, wherein the pipeline structure further comprises a main pipeline communicated to the passage, and the first pipeline and the second pipeline are respectively connected to the main pipeline.

8. The safety vacuum supply gas cylinder according to claim 1, wherein the first check valve is a one-way valve and only allows the gas to flow into the internal space of the cylinder body, and the second check valve is a one-way valve and only allows the gas to flow out of the internal space of the cylinder body.

* * * * *